UNITED STATES PATENT OFFICE.

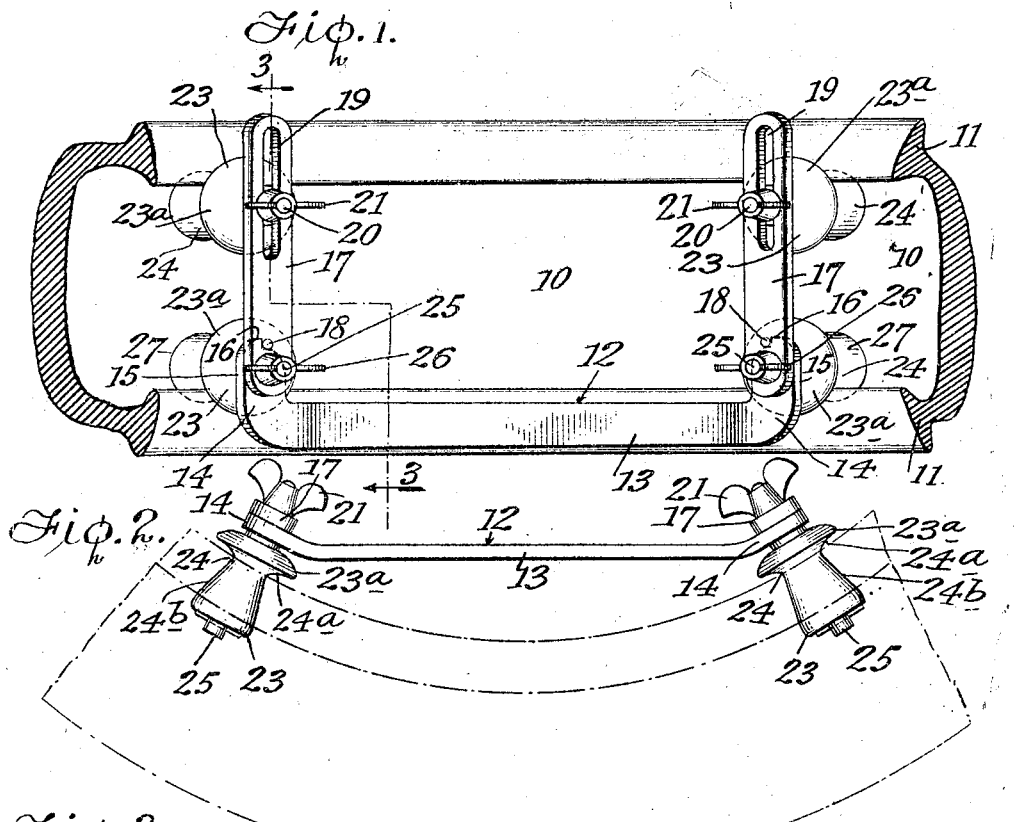
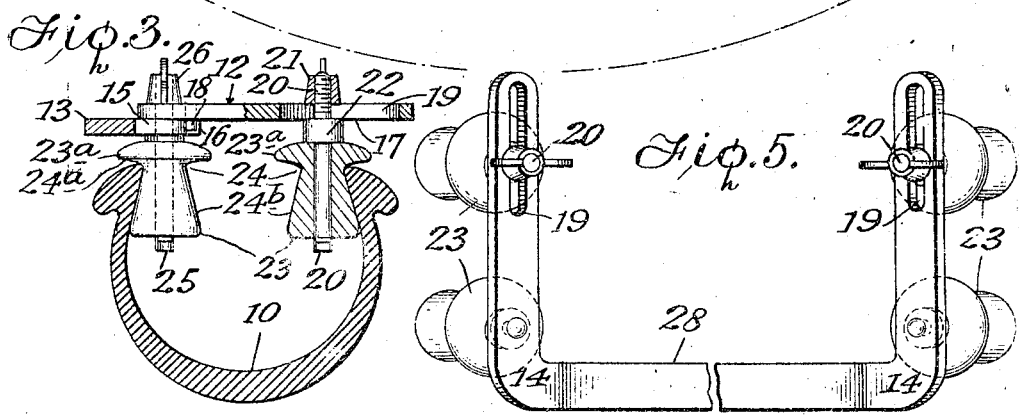
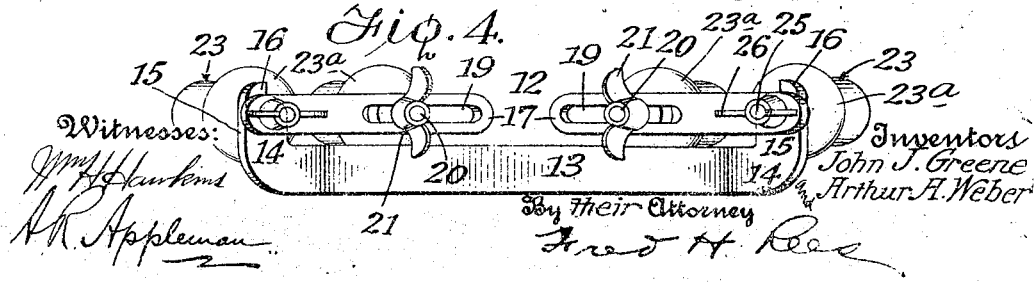

JOHN J. GREENE AND ARTHUR A. WEBER, OF NEW YORK, N. Y.

TIRE-SPREADER.

1,188,538.

Specification of Letters Patent. Patented June 27, 1916.

Application filed September 21, 1915. Serial No. 51,816.

*To all whom it may concern:*

Be it known that we, JOHN J. GREENE and ARTHUR A. WEBER, citizens of the United States, and both residing in the borough of Brooklyn, city, county, and State of New York, and whose post-office addresses are, respectively, No. 804 Classon avenue, borough of Brooklyn, city of New York, and No. 963 East Thirteenth street, borough of Brooklyn, city of New York, have invented certain new and useful Improvements in Tire-Spreaders, of which the following is a specification.

This invention relates to a tire spreader adapted for use in connection with automobile and other rubber tires, one object being to provide a device of the above class which is simple of construction, easily manipulated and inexpensive.

A further object being to provide a device as above described by which an automobile or other rubber tire may be opened at any desired point and retained in such open condition while repairs are being made.

The tire spreader comprises a new and improved construction and arrangement of parts which enables the user to fold the device into compact form when not in use, and is also adjustable to accommodate all sizes of tires now in general use.

A further object of the invention resides in the provision of rollers of novel construction to receive the edges of the tire during the repairing operation.

In the drawings similar reference characters are employed to designate corresponding parts throughout the several views and in which:—

Figure 1. is a plan view showing our improved spreader in operative position on a tire. Fig. 2. is an edge view of the spreader. Fig. 3. is a partial cross section on the line 3—3 of Fig. 1. Fig. 4. is a plan view of the spreader folded. Fig. 5. shows a slightly modified form.

In the drawings an automobile tire is shown at 10, having the usual bead edges 11. The spreader is shown at 12 and comprises a bar 13, having upwardly turned ends 14, provided with right angle perforated extensions 15, formed with stop shoulders 16.

Pivoted to the extensions 15, are link-arms 17, having pins 18, which engage the shoulders 16 when said link-arms are swung outwardly into operative position, and the outer or free ends of the link-arms 17, are slotted as at 19, to adjustably receive threaded pins 20, provided with wing-nuts 21. The pins have shoulders 22, bearing against the under side of the link-arms and beyond the shoulders the pins are unthreaded and each receives a roller 23, provided with a flange $23^a$ and a circumferential groove or recess 24, shaped to provide a shoulder $24^a$ and a divergent wall $24^b$, adapted to receive the bead edges of the tire in interlocking relation as shown in Fig. 3.

The pivot joint between the bar 13 and link-arms 17 is constituted by threaded pins 25, having wing-nuts 26, bearing on the links, and the opposite ends of the pins 25, carry rollers 27, similar to the rollers 23, said rollers being retained in position on the pins 20 and 25, by cotter pins or other suitable means.

It will be understood that the bar 13, and link-arms 17, pivoted thereto, collectively constitute a U shaped frame and in Fig. 5 of the drawings we show a spreader comprising rollers as above described carried by a U shaped frame 28 of one-piece construction which for some work may be preferred to the construction shown in Figs. 1 to 4, inclusive.

Our improved spreader is particularly adapted for use when inspection of the inside of the tire is desired for the reason that when the device is once in position it may be rolled around the tire structure by reason of the interlocking relation of the rollers with the bead edges.

In the operation of the spreader the parts are folded into the position shown in Fig. 4, the smaller or outer ends of the rollers are inserted into the tire opening until the flanges $23^a$ bear thereon, when the link-arms 17, are thrown outward until the pins 18, strike the shoulders 16, when the tire is fully open. The spreader should be placed on the tire so that the puncture or part to be repaired is about midway between the link-arms so as to obtain the maximum working space.

Having thus described our invention what we claim and desire to secure by Letters Patent is:—

1. In a tire spreader, a frame and rollers mounted thereon to engage the bead edges of the tire for the purpose specified.

2. In a tire spreader, a U shaped frame having rollers to engage the tire edges as described.

3. In a tire spreader, a frame having adjustable rollers to engage the tire edges for the purpose specified.

4. In a tire spreader, a frame and grooved rollers carried thereon for the purpose described.

5. In a tire spreader, a frame comprising a bar and link-arms pivoted thereto, two pairs of rollers mounted on said frame one roller of each pair being adjustable toward and from its companion for the purpose described.

6. In a tire spreader, a frame consisting of a central bar and link-arms pivoted thereto, grooved rollers arranged in pairs, one roller of each pair being adjustably mounted on the link-arms and means for limiting the outward movement of said link-arms as shown and described.

7. A tire spreader comprising a frame and rollers mounted thereon, each of said rollers being shaped to provide a flange, a circumferential groove and a divergent wall adapted to receive the tire edges in interlocking relation.

8. A tire spreader comprising a frame having pivoted ends and grooved rollers, the ends of the central portion of the frame being upwardly turned and having perforated right angle extensions to which the said ends of the frame are pivoted as shown and described.

9. A tire spreader comprising a frame and grooved rollers detachably and adjustably mounted thereon, said rollers being mounted on pins provided with shoulders to engage the frame at one side and wing-nuts to engage said frame at the opposite side.

10. In a tire spreader a U shaped frame having slotted swinging end members, grooved rollers arranged in pairs, one roller of each pair being adjustably mounted on the ends of the end members, each of said rollers being provided with a flange and a divergent wall to engage the tire edges in interlocking relation.

In witness whereof we have hereunto set our hands in the presence of two subscribing witnesses.

JOHN J. GREENE.
ARTHUR A. WEBER.

Witnesses:
 CHAS. J. O'CONNOR,
 CATHARINE A. DYT.